(12) United States Patent
Bühler

(10) Patent No.: US 6,673,906 B1
(45) Date of Patent: Jan. 6, 2004

(54) β MODIFIED MONOAZO DYE RESISTANT TO DYEING, ITS PREPARATION AND USE

(75) Inventor: Ulrich Bühler, Alzenau (DE)

(73) Assignee: DyStar Textifarben GmbH & Co. Deutschland KG (DE)

(*) Notice: Subject to any disclaimer, the term of this patent is extended or adjusted under 35 U.S.C. 154(b) by 0 days.

(21) Appl. No.: 08/584,776

(22) Filed: Jan. 11, 1996

(30) Foreign Application Priority Data

Jan. 23, 1995 (DE) .......................... 195 01 845

(51) Int. Cl.⁷ ............................ C09B 29/085
(52) U.S. Cl. ............. 534/855; 534/575; 534/597
(58) Field of Search ............... 534/575, 597, 534/855

(56) References Cited

U.S. PATENT DOCUMENTS

| | | | | |
|---|---|---|---|---|
| 2,007,382 A | | 7/1935 | Ockman et al. | 8/5 |
| 3,956,270 A | * | 5/1976 | Rambach et al. | 534/575 |
| 4,327,999 A | * | 5/1982 | Koller et al. | 534/575 X |
| 4,329,144 A | * | 5/1982 | Eugster et al. | 534/575 X |
| 4,460,375 A | * | 7/1984 | Sommer et al. | 8/526 |
| 4,536,569 A | * | 8/1985 | Hashimoto et al. | 534/575 |
| 4,937,325 A | * | 6/1990 | Buhler, I et al. | 534/573 |
| 5,160,495 A | * | 11/1992 | Buhler, II et al. | 534/854 |
| 5,389,109 A | | 2/1995 | Buhler | 8/495 |

FOREIGN PATENT DOCUMENTS

| | | | | |
|---|---|---|---|---|
| DE | 2525505 | * | 12/1976 | 534/575 |
| DE | 2921210 | * | 12/1980 | 534/575 |
| DE | 0217231 | * | 1/1985 | 534/597 |
| DE | 0217232 | * | 1/1985 | 534/597 |

OTHER PUBLICATIONS

Chemical Abstracts, vol. 81, No. 20, Nov. 18, 1974, Columbus, Ohio, US; abstract No. 122767, p. 131; JP–A–49 037 931 (Mitsubishi Chemical Industries Co.) (Apr. 9, 1974).

Chemical Abstracts, vol. 99, No. 22, Nov. 28, 1983, Columbus, Ohio, US; abstract No. 177482d, NI, JUABO et al.: "New Blue Monoazo Disperse Dyes"; Huadong Huagong Xueyuan Xuebao, Nr. 4, 1982, pp. 437–448.

* cited by examiner

Primary Examiner—Joseph K. McKane
Assistant Examiner—Kamal Saeed
(74) Attorney, Agent, or Firm—Connolly Bove Lodge & Hutz LLP

(57) ABSTRACT

The present invention relates to the β modification of the dye of the formula I

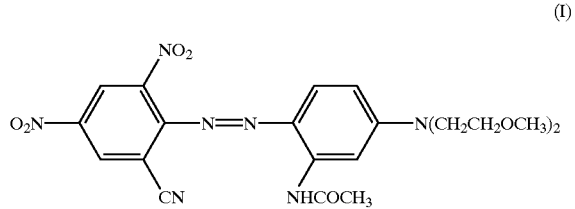

(I)

18 Claims, 4 Drawing Sheets

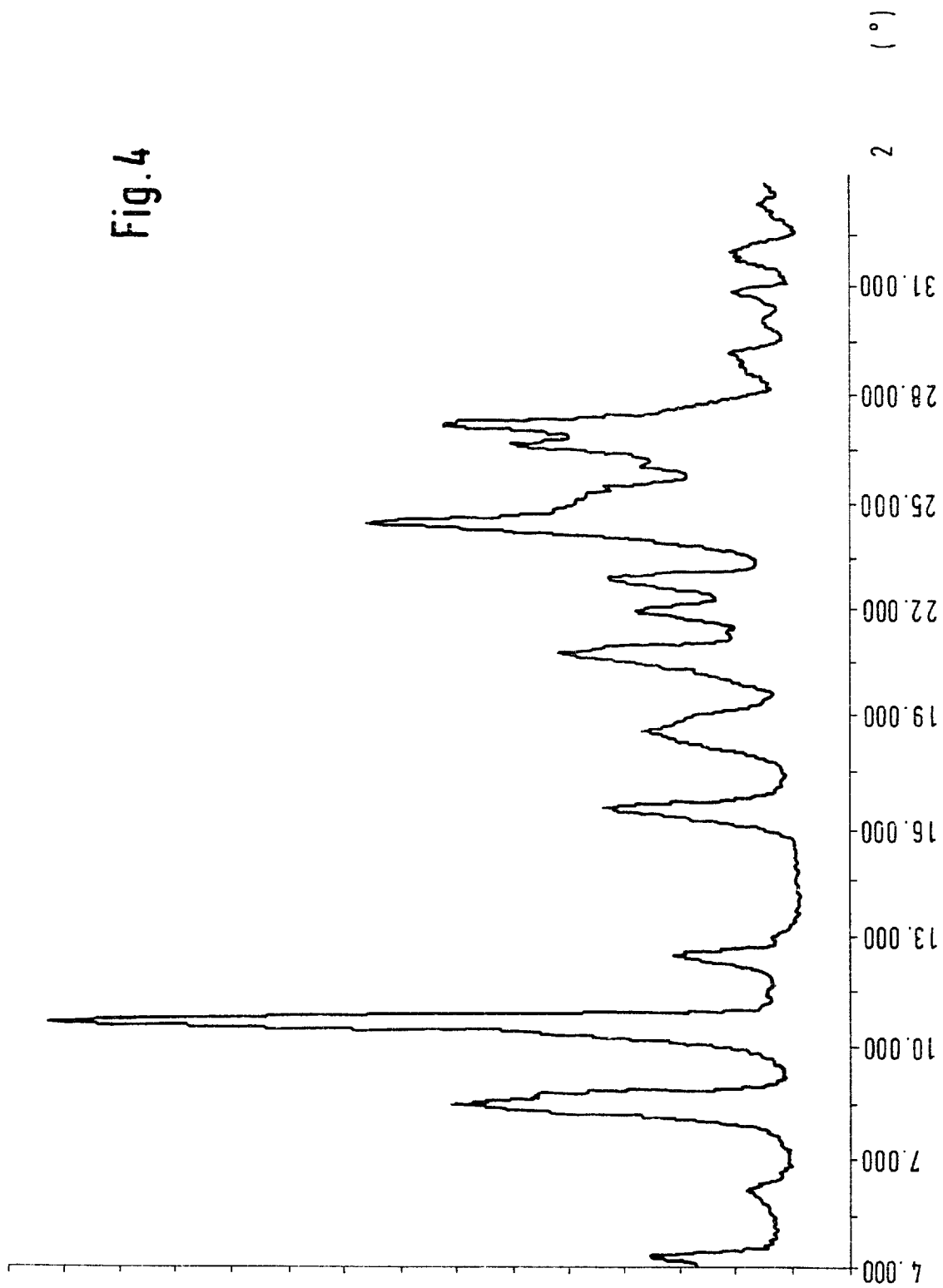

β MODIFIED MONOAZO DYE RESISTANT TO DYEING, ITS PREPARATION AND USE

The present invention relates to a novel crystal modification ("β modification") resistant to dyeing of the dye of the formula I

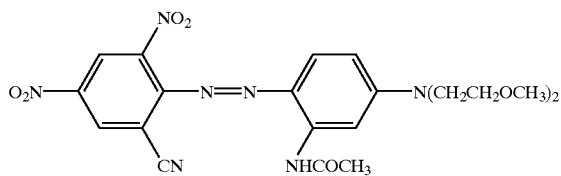

which in the X-ray diffraction pattern (Cu $K_\alpha$ radiation) exhibits lines at the following diffraction angles 2θ (°):

high-intensity lines: 7.15, 10.25, 25.9,
medium-intensity lines: 16.9, 19.5, 20.1, 21.85, 22.65, 23.4, 25.2, 28.5, 32.45.

The X-ray diffraction pattern of the β modification resistant to dyeing, which was recorded using Cu $K_\alpha$ radiation, is shown in FIG. 1. It was recorded using a computer-controlled Siemens D 500 powder diffractometer.

The dye of the formula I is known, its preparation is described, for example, in Japanese Patent Specification 74/37,931. It involves diazotizing 2-cyano-4,6-dinitroaniline and coupling the resulting diazonium salt onto 3-[bis(2-methoxyethyl)amino]acetanilide. This results in the formation of a dye in a slightly crystalline, unstable modification ("$\alpha_1$ modification") whose X-ray diffraction pattern (Cu $K_\alpha$ radiation) is shown in FIG. 2.

An alternative synthesis is described in EP-A-545,161. It involves preparing the dye of the formula I by the so-called cyano exchange method by reacting, for example, 2-acetylamino-4-[bis(2-methoxyethyl)amino]-2'-bromo-4', 6'-dinitroazobenzene with cyanide. In this reaction, it is obtained in a crystal modification ("$\alpha_2$ modification") whose X-ray diffraction pattern (Cu $K_\alpha$ radiation) is reproduced in FIG. 3 and which is characterized by lines at the following diffraction angles 2θ high-intensity lines: 6.1, 18.0, 22.0, 24.3, 25.6, 26.3,
medium-intensity lines: 9.9, 12.5, 13.2, 16.

This crystal modification is also unstable.

However, powder and liquid preparations prepared from these unstable crystal modifications of the dye exhibit substantial technical defects, in particular during handling, but also already during preparation and also during dyeing of textile polyester materials. Technical defects during handling are observed, for example, when these preparations are redispersed, i.e., when they are incorporated in dyeing liquors and printing pastes. However, problems arise especially when these preparations are used in redispersed form in modern dyehouses.

The dye can be used without problems if it is present in the β modification according to the invention. This β modification allows higher space-time yields to be achieved when preparing powder preparations and dyeings are produced on piece goods and wound packages which are speckle-free and free of dye deposits, that is, are homogeneous.

The β modification according to the invention can be obtained by heating the a modifications in aqueous phase to temperatures of 70 to 150° C., preferably 80 to 130° C. This heating usually takes place in aqueous suspension, advantageously with stirring. If the temperatures to be applied are above the boiling point of the aqueous phase, the conversion into the β modification is carried out in sealed vessels, for example autoclaves. Heating is carried out for a time sufficient for converting the a modification completely into the β modification.

BRIEF DESCRIPTION OF THE FIGURES

FIG. 4 illustrates a crystal modification exhibiting the x-ray spectrum.

Figure 1:
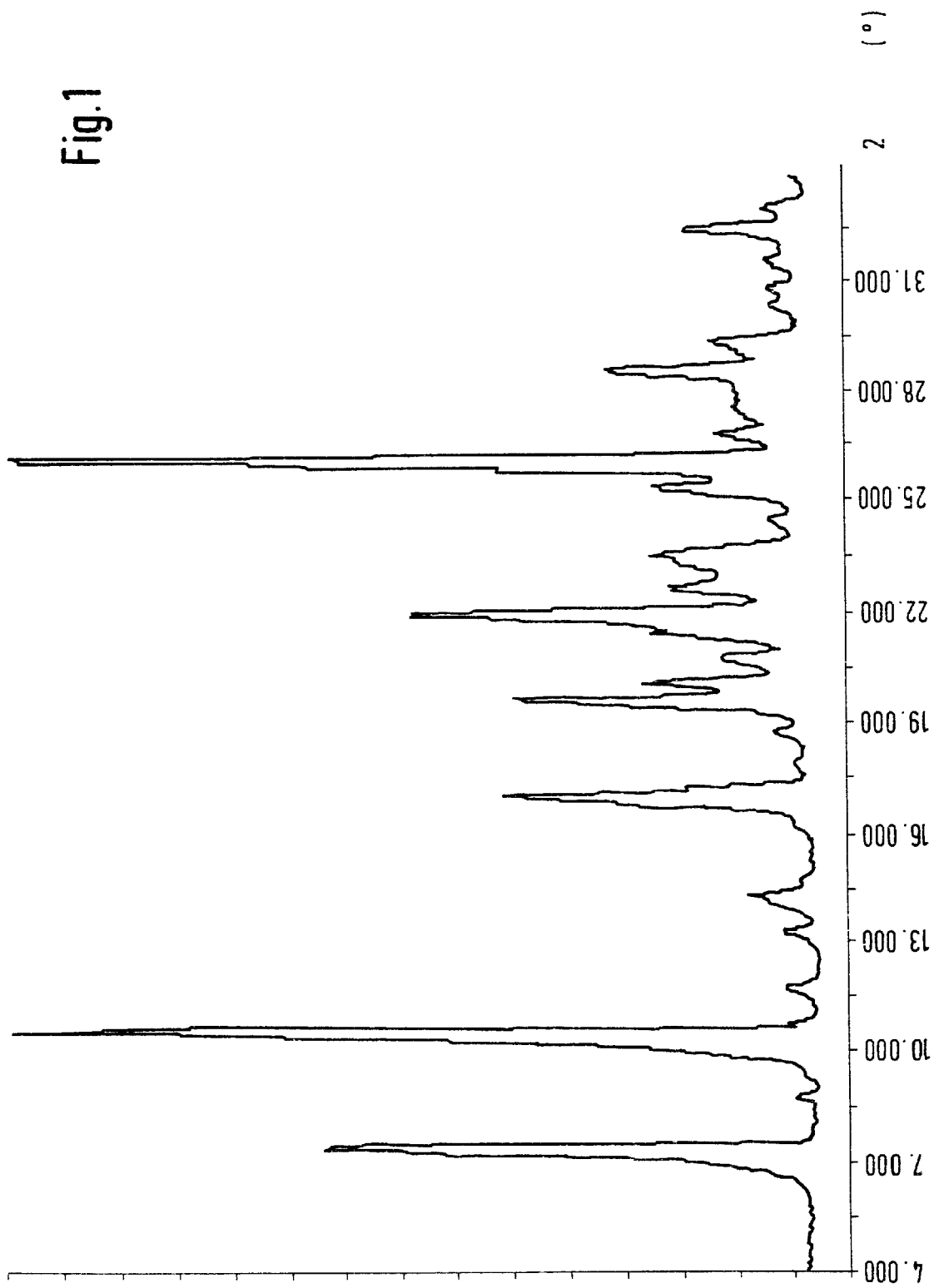
FIG. 1 illustrates conversion of the crystal modification of the x-ray diffraction pattern illustrated from FIG. 3.

Complete conversion of the α into the β modification usually takes 0.5 to 5 hours, it being possible for the reaction to be controlled by X-ray or microscopic analysis of samples removed during the heat treatment.

During conversion of the α into the β modification, it may be advantageous to add one or more surface-active substances to the aqueous phase. The surface-active substances mentioned may have a wetting, viscosity-reducing, dispersing or dissolving effect and be of anionic, cationic or nonionic nature.

Examples of suitable surface-active substances are alkali metal salts of lignosulphonates, alkali metal salts of condensation products of naphthalenesulphonic acids and formaldehyde, polyvinylsulphonates, ethoxylated novolaks, ethoxylated fatty alcohols, polyglycol esters is of fatty acids and tertiary phosphoric esters. The surface-active substances can be used individually or in combination with one another. The amount of surface-active substance, relative to the amount of dye of the formula I in the α modification, is typically 0.01 to 400% by weight and depends on further processing.

After being converted into the β modification, the dye can be isolated from the aqueous suspension, for example by filtration. To avoid pollution of the waste water and to avoid losses in yield, it is customary to use only 0.01 to 10% by weight, preferably 0.1 to 1% by weight, of the surface-active substances.

However, it is also possible to finish the dye immediately after the heat treatment without isolating the intermediate, that is, to convert it into the commercial powder or liquid preparations. To this end, the heat-treated suspension is milled to give a dispersion. Preferably, the heat treatment is carried out in the presence of those dispersing agents and, where appropiate, those auxiliaries whose presence is desired in the finished powder or liquid preparation, or in the presence of a portion of these agents. These dispersing agents are identical to the abovementioned surface-active substances. If the entire amount of these dispersing agents and auxiliaries was not added during the heat treatment, the remaining amount is added before milling. In this case, 10 to 400% by weight, preferably 20 to 200% by weight, of surface-active substances, relative to the dye in the a modification, is usually added for effecting the heat treatment.

Conversion of the α into the β modification by means of a heat treatment in aqueous phase can also be carried out with addition of one or more organic solvents. These organic solvents can either be miscible with water in any ratio or be water-imiscible or else be only slightly miscible with water.

Examples of water-miscible solvents are ethanol, i-propanol and dimethyl sulphoxide (DMSO). Examples of solvents which are water-immiscible or only slightly water-miscible are n-butanol, butyl acetate and toluene.

The temperatures for the heat treatment in aqueous phase with the addition of organic solvents are preferably between 70 and 130° C. Depending on the temperature of the heat treatment or the boiling point of the organic solvent added, it may be necessary to carry out the heat treatment under pressure, for example in an autoclave. The duration of the heat treatment depends, inter alia, on the solubilizing power of the liquid phase, that is, inter alia, also on the solubilizing power of the organic solvent added and its relative amount.

The amount of organic solvents, relative to the aqueous phase, can vary over a wide range. For water-miscible solvents, it can be between 5 and 95% by weight, preferably between 5 and 30% by weight. For solvents which are slightly water-miscible or water-immscible, it is in general between 1 and 25% by weight, preferably 2 to 10% by weight.

After conversion of the dye into the β modification, the organic solvent is usually separated off from the dye suspension by distillation or steam distillation, and the dye is isolated from the aqueous phase by filtration. However, it is also possible to isolate the dye directly from the solvent mixture by filtration.

When heating the dye in aqueous phase, not only a purely aqueous phase but also a phase containing organic solvents, it is advantageous to set the pH of the water phase at 6 to 8, preferably at 7, and to maintain this pH since otherwise losses in colour strength and deviations in hue may occur.

The α modifications of the dye of the formula I can also be converted into the β modification by recrystallization, preferably, by commencing the crystallization at temperatures above 70° C. The solvents used for this recrystallization can be organic solvents, mixtures of organic solvents or else mixtures of water-miscible organic solvents with water. Examples of suitable organic solvents are ethanol, butyl acetate, toluene, dimethylformamide and, in particular, dimethyl sulphoxide.

A useful method is to dissolve the α modification to be converted in the solvent chosen by heating, followed by crystallization of the β modification upon cooling. Alternatively, the β modification can be precipitated from the solution by adding a solvent of poorer solubilizing power, for example water. Preferably, this is done by commencing the crystallization of the dye at temperatures between 70 and 130° C., preferably between 70 and 100° C., in particular if the solvent used is dimethyl sulphoxide. This can be achieved, for example, by selecting the dye concentration in the solvent at such a level that the saturation limit is 70° C. or more.

The resulting dye in the β modification can be isolated from the solvent by filtration. However, it is also possible to add water, followed by driving off the solvent by distillation or steam distillation and isolating the dye from the aqueous phase by filtration.

If the dye of the formula I is prepared by the abovementioned coupling reaction, an alternative method is to effect conversion of the α into the β modification immediately after coupling by subjecting the coupling suspension to a heat treatment. This can take place in the same reaction vessel as the coupling. To prevent the dye from being hydrolysed, the mineral acid from the diazotization and coupling is substantially or completely neutralized beforehand in the coupling suspension.

Particularly preferably, the stable β modification can also be obtained as early as during the synthesis known per se of the dye from the precursor of the general formula II

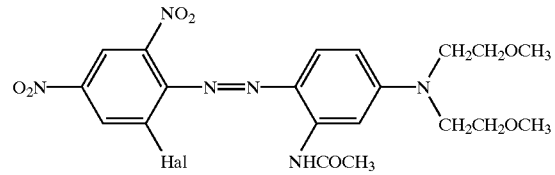

(II)

in which Hal represents bromine or chlorine, by the abovementioned cyano exchange if crystallization of the dye commences at temperatures above 70° C., that is, for example, at temperatures between 70 and 110° C., in particular between 80 and 100° C. This requires that some or all of the dye of the formula I precipitates or can be precipitated from the solvent in which the cyano exchange takes place at temperatures above 70° C. Examples of solvents for the cyano exchange are alcohols, such as n-butanol, diols, such as ethylene glycol, or, in particular, dipolar aprotic solvents, such as dimethylformamide, N-methylpyrrolidone or, preferably, dimethyl sulphoxide, which may also be used in a mixture with one another or, for example, with water.

With a view to a complete reaction during the cyano exchange, it is advantageous for the dye precursor or the dye itself to be largely or completely dissolved at the reaction temperature. Precipitation of the dye at temperatures above 70° C., after reaction is complete, can be achieved either by a suitable selection of the amount of solvent or else by addition of solvents for precipitation which have a lower solubilizing power for the dye, thus precipitating it. Examples of such solvents for precipitation are ethanol, toluene or cyclohexane. However, it is also possible to use water for precipitation. Such solvents for precipitation can already be present during the reaction or else can be added, after reaction is complete, or during the cooling process. In this case, too, the amount added depends again on the solubilizing power or, better, on the precipitating power of the relevant solvent.

If during cooling after the reaction or during recrystallization at temperatures above 70° C. a sufficient amount of dye crystals in the β modification is present, precipitation of crystals in the β modification continues even at lower temperatures so that precipitation can be completed by appropriate cooling.

The dye of the formula I converted into the β modification by means of a heat treatment or by crystallization or formed as the β modification during cyano exchange must then be converted into a dispersion by means of a milling process, i.e., into a liquid or pulverulent dye preparation. This milling takes place in mills, such as, for example, ball mills, vibration mills, pearl mills or sand mills, or in kneaders. After milling, the size of the dye particles is about 0.1 to 10 μm. Milling is carried out in the presence of dispersing agents, such as, for example, condensation products of naphthalenesulphonic acid and formaldehyde, or phenol, formaldehyde, and sodium bisulphite, alkali metal salts of lignosulphonates, or sulphite cellulose waste liquor or polyvinylsulphonates, which coat the surface of the mechanically comminuted dye particles, thus preventing their recrystallization. It may be advantageous to add, in addition to these dispersing agents, also other auxiliaries to the dye during milling, such as, for example, wetting agents, antifreeze agents, dustproofing agents, hydrophilizing agents or biocides.

The drying process necessary for preparing dye powders can be carried out in commercially available spray dryers.

The β modification according to the invention of the dye of the formula I is not prone to agglomeration in pulverulent and, in particular, in liquid dye preparations, and it causes better wetting than the α modifications when making up dyeing and padding liquors and also printing pastes and is rapidly dispersible without requiring any laborious manual or mechanical stirring. The liquors and printing pastes are homogeneous and processible without problems in modern dyehouses and without causing clogging of the nozzles.

The liquid preparations are not prone to phase separation and in particular not prone to sedimentation and settling in the form of cement. Accordingly, homogenization of the dye in the packaging drum before removal of the dye, which would be equally laborious, can be dispensed with.

The milling paste obtained during preparation of the powder after milling of the dye in the presence of dispersing agents and auxiliaries is stable even at elevated temperature and over longer periods of time. The milling paste need not be cooled neither in the mills nor after leaving the mills and can be stored in receiving tanks before spray-drying over longer periods of time. The thermal stability is also evidenced by the fact that spray-drying can be carried out at high temperatures without any agglomeration of the material to be dried. Increasing the inlet temperature of the dryer while maintaining the outlet temperature at the same level results in an increase of the drying capacity and accordingly in a lowering of the manufacturing costs.

In contrast to the α modifications, the β modification according to the invention of the dye of the formula I is suitable without restrictions for dyeing and printing textile materials made of polyester, such as polyethylene glycol terephthalate, and/or cellulose esters, such as cellulose acetates, or blend fabrics of these materials with wool or cellulose.

The superiority of the β modification compared with the α modifications is also apparent when dyeing from an aqueous dying bath under the conditions of modern practice. These conditions are characterized by high package densities in package- and beam-dyeings, short liquor ratios, that is, high dye concentrations and high shear in the dyeing liquor caused by high pumping capacities. Even under these conditions, the β modification is not prone to agglomeration, and no deposits are observed on the textile materials to be dyed. This means that homogeneous dyeings without any differences in colour strength between the outer and the inner layers of the wound packages are obtained, the dyeings not exhibiting any abrasion. Finally, the use of the β modification according to the invention for pad-dyeings and prints produces likewise a homogeneous, speckle-free appearance of the goods.

Figure 3:
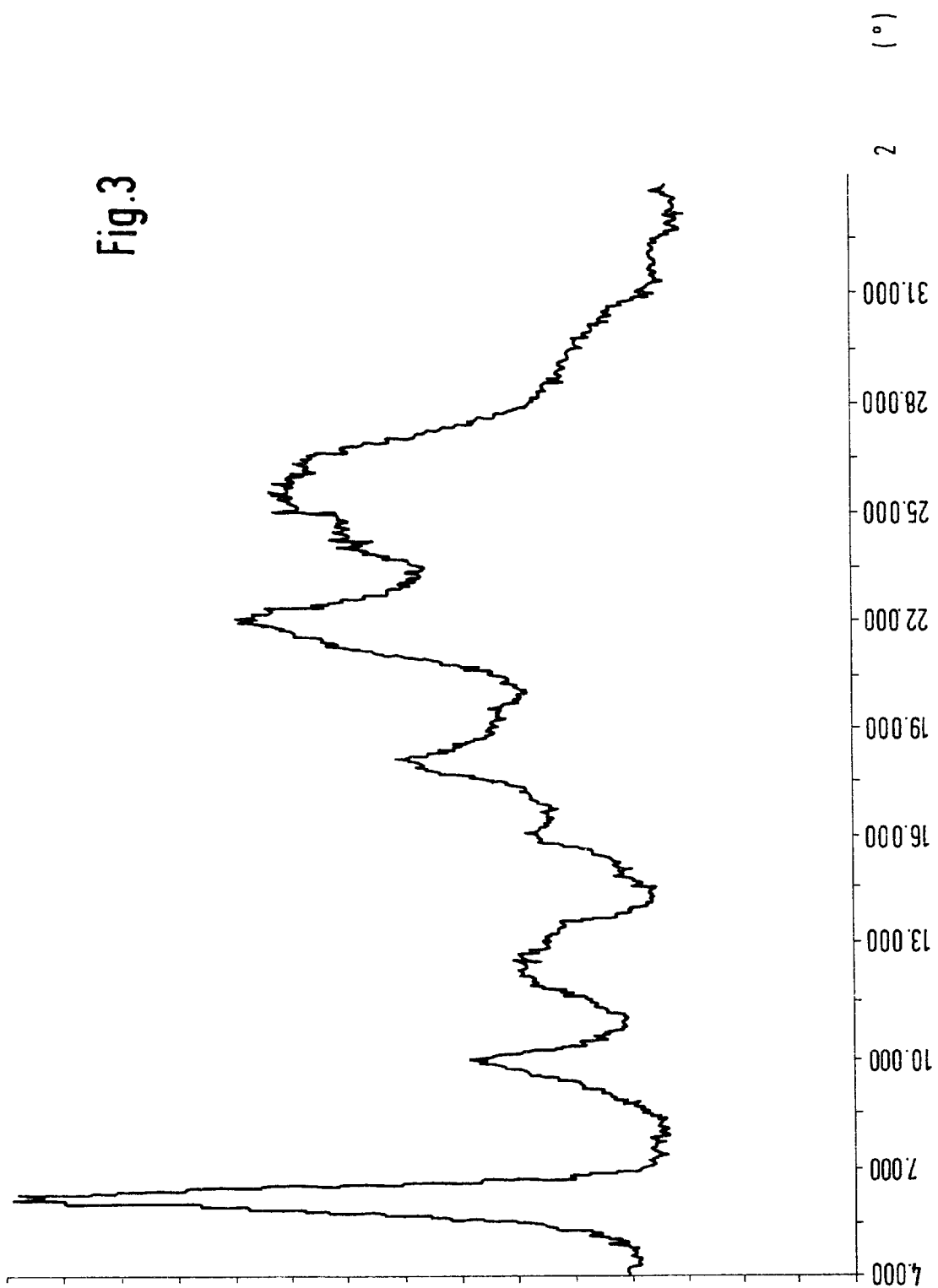
FIG. 3 illustrates the x-ray diffraction pattern according to the prior art.

EXAMPLE 1 a) 100 g of the dye of the formula I present in the crystal modification exhibiting the X-ray diffraction pattern reproduced in FIG. 3 is heated in 200 ml of water in the presence of 0.5 g of an anionic wetting agent based on oleic acid at 95° C. for 3 hours. This treatment results in conversion of the crystal modification into the one exhibiting the X-ray diffraction pattern reproduced in FIG. 1. The dye is isolated by filtration and washed with water.

b) 45 g of this dye is milled in a sand mill together with 63 g of a sodium lignosulphonate, 6 g of a methylene-bridged alkylphenol ethoxylate partially esterified with succinic acid and a total of 186 g of water until the fine dispersion of 90% of the particles is $\leq 1$ μm. The liquid preparation thus obtained does not settle, is homogeneous and can be pressed any repeated number of times in portions through a stainless steel nozzle 0.7 mm in diameter at a pressure of 3 kp/m², without any splashing occuring during this metering or, worse, clogging of the nozzle.

EXAMPLE 2 a) 50 g of the dye of the formula I present in the crystal modification exhibiting the X-ray diffraction pattern reproduced in FIG. 3 is dissolved in 95 g of 90% (by weight) aqueous DMSO at 100° C., the resulting solution is slowly cooled to 80° C. with stirring and stirred at 80° C. for about 4 hours. This leads to precipitation of dye crystals. The temperature is now lowered to room temperature with stirring, and the precipitated dye is filtered off and washed with water. It is present in the crystal modification exhibiting the X-ray diffraction pattern reproduced in FIG. 1.

b) The dye obtained according to 2a) is now converted into a liquid preparation by the procedure of Example 1b. If this liquid preparation is used for dyeing a polyester web by the thermosol method, a homogeneous, speckle-free blue dyeing is obtained.

c) If the 95 g of 90% (by weight) DMSO of Example 2a is replaced by 400 g of 90% (by weight) DMSO, the first dye crystals do not precipitate upon cooling until is 40° C. is reached. Further cooling to room temperature and isolation of the precipitated dye gives a crystal modification exhibiting the X-ray spectrum (Cu $K_\alpha$ radiation) reproduced in FIG. 4. If this dye is finished and used for dyeing by the procedure of Example 2b, the dyeing exhibits clearly visible speckles.

EXAMPLE 3 a) 135 g of the dye precursor of the formula IIa

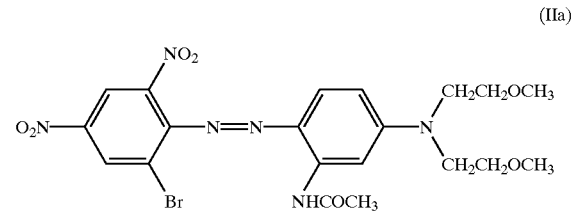

Figure 2:
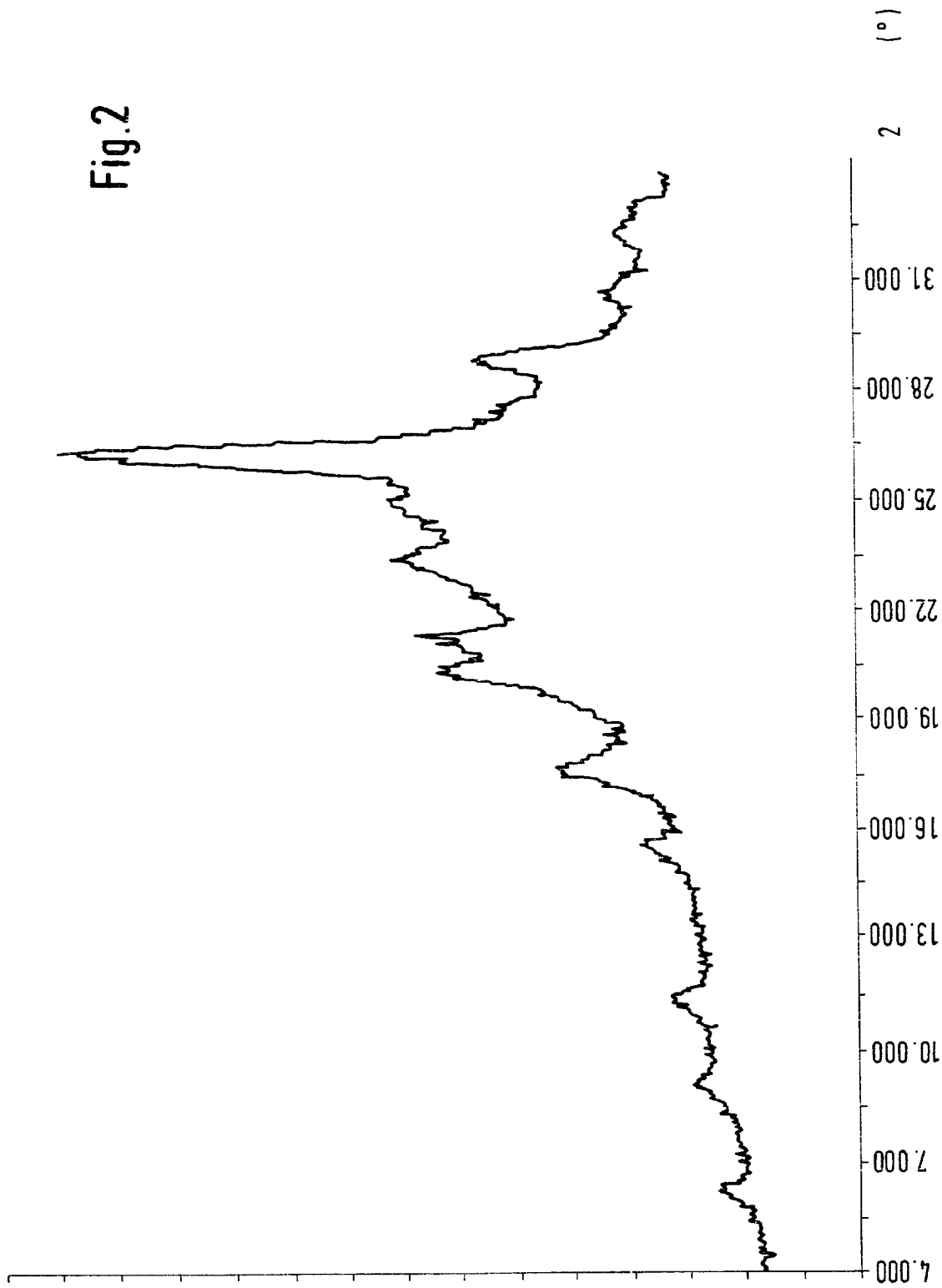
FIG. 2 illustrates an x-ray spectrum of a powder preparation prepared by the procedure of 3b) from a dye of formula I.

(IIa)

are stirred into a solution of 6.4 g of sodium cyanide and 11.8 g of copper(I) cyanide in 310 g of 90% aqueous DMSO at 80 to 85° C., and stirring at this temperatur is continued for 1 hour. The first crystals of the dye of the formula I already precipitate during the stirred addition and in particular while stirring is continued. The batch is slowly cooled to room temperature, and the product is filtered off and washed with water and aqueous DMSO. 120 g of a dye paste containing 96 g of the dye of the formula I is isolated. The dye is present in the crystal modification exhibiting the X-ray diffraction pattern reproduced in FIG. 1.

b) 50 g of the dye prepared according to 3a) is milled in a pearl mill together with 70 g of a sodium lignosulphonate, 30 g of a condensation product of cresol, nonylphenol, formaldehyde and sodium bisulphite and water until the fine dispersion of 90% of the particles is $\leq 1$ μm. The milling paste thus obtained is spray-dried in a spray-dryer at an inlet temperature of 155° C. and an outlet temperature of 85° C.

c) If, in order to prepare a dyeing liquor, the powder obtained according to 3b) is introduced into water, some of it already disperses while sinking to the bottom of the vessel, and all of it disperses after stirring for a short period of time.

d) In contrast, a powder preparation prepared by the procedure of 3b) from a dye of the formula I exhibiting the X-ray spectrum of FIG. 2 or of FIG. 3 needs to be stirred for a longer period of time using a special stirrer until a homogeneous dispersion is obtained and then, if necessary, filtered in order to obtain speckle-free thermosol dyeings.

e) If the powder preparation prepared according to 3b) is used for dyeing packages, the dyeings obtained are level and rub-fast, i.e., the colour depths in the outer and inner layers of the wound package are identical and no dye deposits are observed.

I claim:

1. β modification of the dye of the formula I

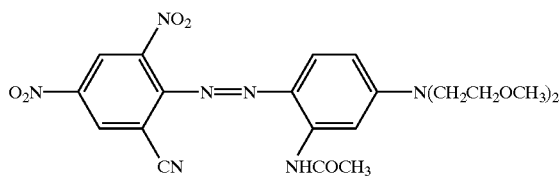

(I)

having an X-ray diffraction pattern (Cu $K_\alpha$ radiation) containing lines at the following diffraction angles 2θ (°):

high intensity lines: 7.15, 10.25, 25.9,
medium-intensity lines: 16.9, 19.5, 20.1 21.85, 22.65, 23.4, 25.2, 28.5, 32.45.

2. A process for preparing the β modification of the dye of the formula I according to claim 1, comprising heating the dye which is not present in the β modification in an aqueous phase at temperatures from about 70 to about 150° C.

3. The process according to claim 2, wherein said temperature is from about 80 to about 130° C.

4. The process according to claim 2, wherein the heating takes place in the presence of one or more surface-active substances.

5. The process according to claim 2, wherein the heating takes place in the presence of one or more organic solvents.

6. The process according to claim 3, wherein the heating takes place in an aqueous suspension and said suspension is being stirred during said heating.

7. The process as claimed in claim 4, wherein the surface active substance is alkali metal salts of lignosulphonates, alkali metal salts of condensation products of naphthalene sulphonic acids and formaldehyde, polyvinylsulphonates, ethoxylated novolaks, ethoxylated fatty alcohols, polyglycol esters of fatty acids or tertiary phosphoric esters or mixtures thereof.

8. The process as claimed in claim 7, wherein the surface active substance is present in an amount from about 0.01 to about 400% by weight relative to the amount of the dye of formula I.

9. The process according to claim 5, wherein said organic solvent is ethanol, i-propanol, dimethyl sulphoxide, n-butanol, butyl acetate or toluene.

10. The process as claimed in claim 9, wherein the organic solvent is ethanol, i-propanol or dimethyl sulphoxide and is present in an amount from about 5 to about 30% by weight.

11. The process as claimed in claim 9, wherein the organic solvent is n-butanol, butyl acetate or toluene and is present in an amount from about 1 to about 25% by weight.

12. The process as claimed in claim 11, wherein said solvents is present in an amount from about 2 to about 10% by weight.

13. A process for preparing the β modification of the dye of the formula I according to claim 1, comprising recrystallization of the formula I which is not present in the β modification at temperatures above about 70° C.

14. A process for preparing the β modification of the dye of the formula I according to claim 1, comprising synthesizing a dye of the compound of the formula II

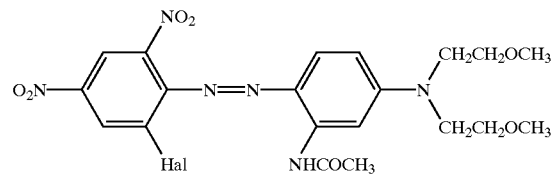

(II)

in which Hal represents bromine or chlorine, reacting said compound of the formula II with cyanide and commencing crystallization of the obtained dye of the formula I at temperatures above about 70° C.

15. The process according to claim 14, wherein a solvent is used in said synthesis and said solvent is dimethyl sulphoxide or water-containing dimethyl sulphoxide or a mixture thereof and said temperature of said crystallization is between about 80 and about 100° C.

16. A process for preparing a liquid dye preparation comprising dispersing the dye of the formula I according to claim 1, into a liquor.

17. A process for preparing a pulverulent dye preparation comprising dispersing the dye of the formula I according to claim 1, into a liquor and drying the liquor.

18. A process for dyeing and printing a textile material made of polyester or cellulose esters or mixture thereof or blend fabrics of these material with wool or cellulose comprising dying said materials with wool or cellulose with the β modification of the dye of formula I as claimed in claim 1.

* * * * *